(12) United States Patent
Boggs et al.

(10) Patent No.: US 12,198,380 B2
(45) Date of Patent: Jan. 14, 2025

(54) VISION-BASED NAVIGATION SYSTEM INCORPORATING HIGH-CONFIDENCE ERROR OVERBOUNDING OF MULTIPLE OPTICAL POSES

(71) Applicant: Rockwell Collins, Inc., Cedar Rapids, IA (US)

(72) Inventors: Christopher M. Boggs, Gainesville, VA (US); Robert B. Anderson, Sterling, VA (US); Weston J. Lahr, Sherwood, OR (US); Richard M. Rademaker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 401 days.

(21) Appl. No.: 17/685,032

(22) Filed: Mar. 2, 2022

(65) Prior Publication Data

US 2023/0222690 A1 Jul. 13, 2023

Related U.S. Application Data

(63) Continuation-in-part of application No. 17/573,283, filed on Jan. 11, 2022.

(51) Int. Cl.
*G06T 7/70* (2017.01)
*G01C 23/00* (2006.01)
(Continued)

(52) U.S. Cl.
CPC .............. *G06T 7/75* (2017.01); *G01C 23/00* (2013.01); *G06V 10/147* (2022.01);
(Continued)

(58) Field of Classification Search
CPC ................................. G06T 7/73; G06V 20/17
See application file for complete search history.

(56) References Cited

U.S. PATENT DOCUMENTS 5,645,077 A 7/1997 Foxlin
5,812,257 A 9/1998 Teitel et al.
(Continued)

FOREIGN PATENT DOCUMENTS

CA 3058955 C 5/2022
EP 1203285 A1 5/2002
(Continued)

OTHER PUBLICATIONS

Alcantara, et al., (2011). Alternative Position, Orientation and Data Recognition Algorithms for Augmented Reality Markers. Retrieved at https://www.researchgate.net/publication/267246987_ALTERNATIVE_POSITION_ORIENTATION_AND_DATA_RECOGNITION_ALGORITHMS_FOR_AUGMENTED_REALITY_MARKERS.
(Continued)

*Primary Examiner* — Sam Bhattacharya
(74) *Attorney, Agent, or Firm* — Suiter Swantz IP

(57) ABSTRACT

A system and method for high-confidence error overbounding of multiple optical pose solutions receives a set of candidate correspondences between 2D image features captured by an aircraft camera and 3D constellation features including at least one ambiguous correspondence. A candidate estimate of the optical pose of the camera is determined for each of a set of candidate correspondence maps (CMAP), each CMAP resolving the ambiguities differently. Each candidate pose estimate is evaluated for viability and any non-viable estimates eliminated. An individual error bound is determined for each viable candidate pose estimate and CMAP, and based on the set of individual error bounds a multiple-pose containment error bound is determined, bounding with high confidence the set of candidate CMAPs and multiple pose estimates where at least one is correct. The containment error bound may be evaluated for accuracy as
(Continued)

required for flight operations performed by aircraft-based instruments and systems.

12 Claims, 8 Drawing Sheets

(51) Int. Cl.
*G06T 7/73* (2017.01)
*G06V 10/147* (2022.01)
*G06V 10/75* (2022.01)
*G06V 10/98* (2022.01)
*G08G 5/00* (2006.01)

(52) U.S. Cl.
CPC .......... *G06V 10/757* (2022.01); *G06V 10/993* (2022.01); *G08G 5/0047* (2013.01); *G06T 2207/10032* (2013.01); *G06T 2207/30252* (2013.01); *G06V 2201/07* (2022.01)

(56) References Cited

U.S. PATENT DOCUMENTS

| | | | |
|---|---|---|---|
| 6,162,191 A | 12/2000 | Foxlin | |
| 6,176,837 B1 | 1/2001 | Foxlin | |
| 6,311,129 B1 | 10/2001 | Lin | |
| 6,361,507 B1 | 3/2002 | Foxlin | |
| 6,377,401 B1 | 4/2002 | Bartlett | |
| 6,408,245 B1 | 6/2002 | An et al. | |
| 6,409,687 B1 | 6/2002 | Foxlin | |
| 6,449,559 B2 | 9/2002 | Lin | |
| 6,474,159 B1 | 11/2002 | Foxlin et al. | |
| 6,480,152 B2 | 11/2002 | Lin et al. | |
| 6,658,354 B2 | 12/2003 | Lin | |
| 6,681,629 B2 | 1/2004 | Foxlin et al. | |
| 6,738,714 B2 | 5/2004 | McCall et al. | |
| 6,786,877 B2 | 9/2004 | Foxlin | |
| 6,820,025 B2 | 11/2004 | Bachmann et al. | |
| 7,000,469 B2 | 2/2006 | Foxlin et al. | |
| 7,046,215 B1 | 5/2006 | Bartlett | |
| 7,266,446 B1 | 9/2007 | Pelosi | |
| 7,301,648 B2 | 11/2007 | Foxlin | |
| 7,395,181 B2 | 7/2008 | Foxlin | |
| 7,409,290 B2 | 8/2008 | Lin | |
| 7,640,106 B1 | 12/2009 | Stokar et al. | |
| 7,672,781 B2 | 3/2010 | Churchill et al. | |
| 8,019,538 B2 | 9/2011 | Soehren et al. | |
| 8,165,844 B2 | 4/2012 | Luinge et al. | |
| 8,953,154 B2 | 2/2015 | Galea et al. | |
| 8,965,736 B2 | 2/2015 | Horton et al. | |
| 9,031,809 B1 | 5/2015 | Kumar et al. | |
| 9,478,141 B2 | 10/2016 | Revell et al. | |
| 9,569,668 B2 | 2/2017 | Schertler | |
| 9,779,550 B2 | 10/2017 | Tobita | |
| 9,891,705 B1 | 2/2018 | Lahr et al. | |
| 10,216,265 B1 | 2/2019 | Kirchner et al. | |
| 10,597,168 B2 | 3/2020 | Boada-Bauxell et al. | |
| 10,664,989 B1 | 5/2020 | Goslin et al. | |
| 10,775,881 B1 | 9/2020 | Ahr et al. | |
| 10,909,715 B1 | 2/2021 | Boggs et al. | |
| 11,036,453 B1 | 6/2021 | Jarrett et al. | |
| 11,055,875 B2 | 7/2021 | Cramblitt | |
| 11,320,650 B1 | 5/2022 | Tiana et al. | |
| 11,354,815 B2 | 6/2022 | Suzuki et al. | |
| 11,354,868 B1 | 6/2022 | Judd et al. | |
| 11,360,552 B1 | 6/2022 | Tiana | |
| 11,365,974 B2 | 6/2022 | Mendez et al. | |
| 11,880,034 B2 | 1/2024 | Tiana et al. | |
| 11,914,763 B1 | 2/2024 | Boggs et al. | |
| 2004/0149036 A1 | 8/2004 | Foxlin et al. | |
| 2010/0039294 A1 | 2/2010 | Feyereisen et al. | |
| 2010/0045701 A1 | 2/2010 | Scott et al. | |
| 2013/0234850 A1 | 9/2013 | Lee et al. | |
| 2013/0237811 A1 | 9/2013 | Mihailescu et al. | |
| 2014/0212000 A1 | 7/2014 | Yagcioglu et al. | |
| 2015/0317838 A1 | 11/2015 | Foxlin | |
| 2015/0332153 A1 | 11/2015 | Bourdis et al. | |
| 2016/0148045 A1 | 5/2016 | Bicer et al. | |
| 2017/0358131 A1 | 12/2017 | Weiss et al. | |
| 2019/0041979 A1 | 2/2019 | Kirchner et al. | |
| 2019/0196198 A1 | 6/2019 | Aymeric et al. | |
| 2020/0005448 A1 | 1/2020 | Subramanian et al. | |
| 2021/0319709 A1 | 10/2021 | Rose et al. | |
| 2022/0050290 A1 | 2/2022 | Fortin-Deschênes et al. | |
| 2023/0100979 A1 | 3/2023 | Wan et al. | |
| 2023/0110716 A1 | 4/2023 | Fletcher et al. | |
| 2023/0222689 A1 | 7/2023 | Boggs et al. | |

FOREIGN PATENT DOCUMENTS

| | | |
|---|---|---|
| EP | 1157326 B1 | 10/2002 |
| EP | 2201532 B1 | 2/2012 |
| EP | 3690734 A1 | 8/2020 |
| EP | 3668792 A4 | 8/2021 |
| EP | 3864491 A1 | 8/2021 |
| WO | 2017042578 A1 | 3/2017 |

OTHER PUBLICATIONS

Cai, Xingcheng. A Prototype Helmet Fitting System for Concussion Protection. Diss. M. Sc. thesis, School of Computing, Queen's University, Kingston, Ontario, Canada, 2015. (Year:2015).

Extended European Search Report dated May 10, 2023; European Application No. 23151205.4.

Extended Search Report in European Application No. 181870114 dated Jan. 7, 2019, 10 pages.

Ferrin F J: "Survey of Helmet Tracking Technologies", Visual Communications and Image Processing; Jan. 20, 2004-Jan. 20, 2004; San Jose, vol. 1456, Feb. 26, 1991 (Feb. 26, 1991), pp. 86-94, XP000578495, DOI: 10.1117/12.45422, ISBN: 978-1-62841-730-2.

U.S. Appl. No. 17/573,283, filed Jan. 11, 2022, Boggs et al.

Chatterji, G.B. et al.: "GPS/machine vision navigation system for aircraft", IEEE Transactions on Aerospace and Electronic Systems, IEEE Service Center, Piscataway, NJ, US, vol. 33, No. 3, Jul. 1, 1997, pp. 1012-1025.

Extended European Search Report dated Jun. 16, 2023; European Application No. 23150030.7.

Pieniazek, Jacek: "Measurement of aircraft approach using airfield image", Measurement, vol. 141, Jul. 1, 2019, pp. 396-406.

Tonhuser, Christian et al: "Integrity Concept for Image-Based Automated Landing Systems", PNT 2015—Proceedings of the ION 2015 Pacific PNT Meeting, The Institute of Navigation, 8551 Rixlew Lane, Suite 360, Manassas, VA 20109, USA, Apr. 23, 2015, pp. 733-747.

Calhoun, Sean M. et al.: "Integrity determination for a vision based precision relative navigation system", 2016 IEEE/ION Position, Location and Navigation Symposium (Plans), IEEE, Apr. 11, 2016, pp. 294-304.

Extended European Search Report dated Jun. 22, 2023; European Application No. 23150358.2.

Frisch Gabriel et al: "High Integrity Lane Level Localization Using Multiple Lane Markings Detection and Horizontal Protection Levels", 2018 15th International Conference on Control, Automation, Robotics and Vision (ICARCV), IEEE, Nov. 18, 2018, pp. 1496-1501.

Hecker P. et al: "Optical Aircraft Positioning for Monitoring of the Integrated Navigation System during Landing Approach", Gyroscopy and Navigation, Pleiades Publishing, Moscow, vol. 10, No. 4, Oct. 1, 2019, pp. 216-230.

Extended European Search Report dated May 12, 2023; European Application No. 23150052.1.

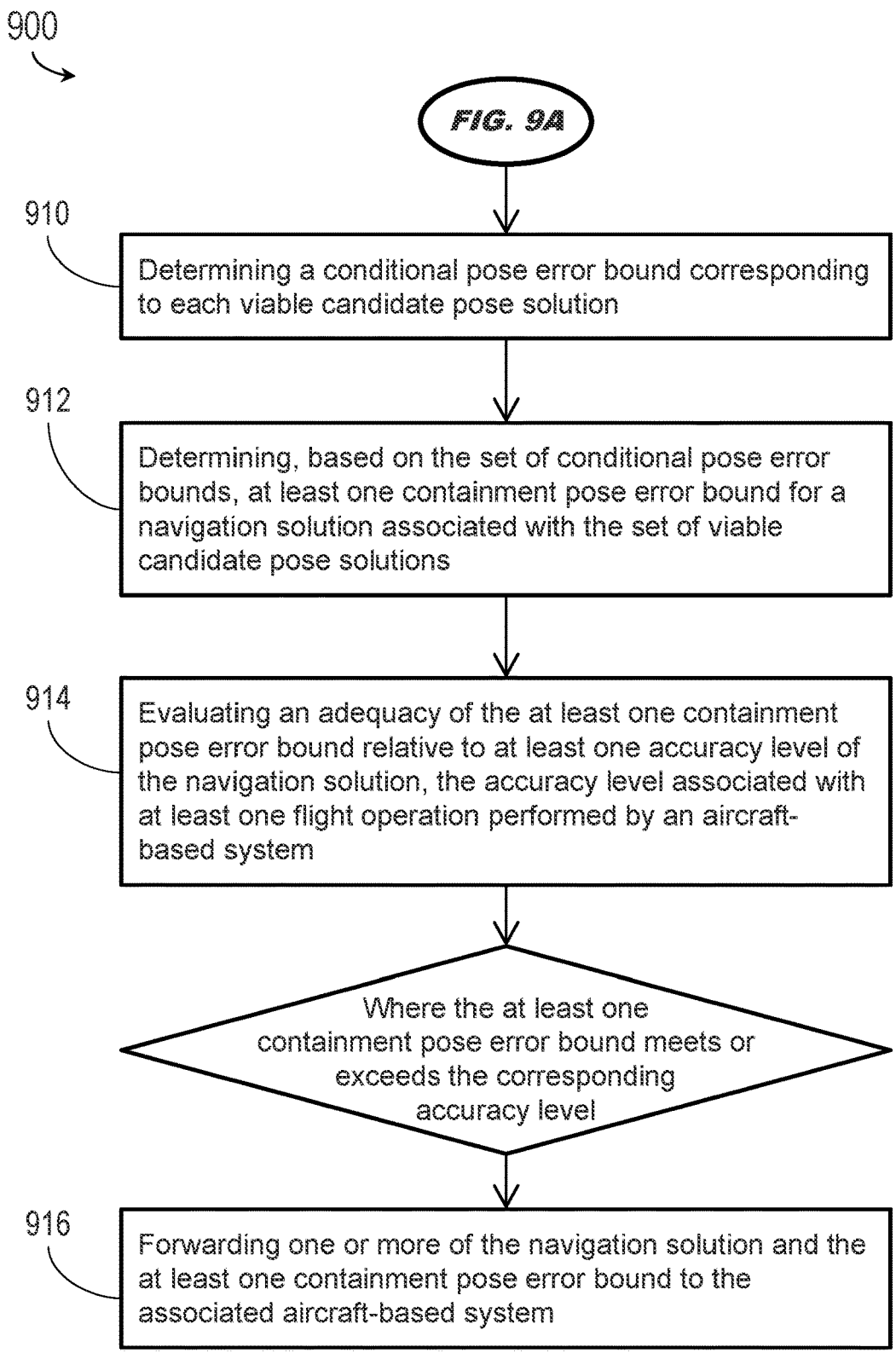

VISION-BASED NAVIGATION SYSTEM INCORPORATING HIGH-CONFIDENCE ERROR OVERBOUNDING OF MULTIPLE OPTICAL POSES

CROSS-REFERENCE TO RELATED APPLICATIONS

The instant application is related to, and incorporates by reference in its entirety, the U.S. patent application Ser. No. 17/573,283 filed Jan. 11, 2022 and entitled VISION-BASED NAVIGATION SYSTEM INCORPORATING MODEL-BASED CORRESPONDENCE DETERMINATION WITH HIGH-CONFIDENCE AMBIGUITY IDENTIFICATION.

BACKGROUND

Optical pose estimation is used increasingly in avionics applications such as vision-based relative navigation for platform-based terminal guidance and formation flying. Computer vision-based solutions are attractive because they offer low SWaP-C and availability when other sensor modalities are not available (e.g., GPS, Radio, magnetometer). For example, model-based pose estimation attempts to determine an optical pose (e.g., position and orientation) of the camera relative to a target environment. For vision-based navigation systems, the target environment may be a runway to which an aircraft may be on approach, the runway surrounded by lighting infrastructure arranged in such a way as to provide navigational information. An external camera may be fixed to the aircraft in a known orientation, and capture images of the three-dimensional target environment. The pose estimate may be based on a detailed comparison of the two-dimensional (2D) images with the three-dimensional (3D) features, e.g., approach/runway lighting structures or runway markings, depicted thereby; these "constellation features" or constellation features, depicted thereby: e.g., runway lighting structures.

In order for safety-critical applications to apply optical pose, however, pose estimates must incorporate reliable overbounds of any errors in the pose estimate. A reliable correspondence map (CMAP), via which features observed and detected in the camera image are mapped to the real-world runway features the images purport to depict, may be sufficient for a reliable, high-confidence pose error bound, ensuring a reliable CMAP may not be straightforward, e.g., in the absence of an accurate optical pose. For example, if the optical pose is not known, the lack of information about projective and geometric relationships between the 3D features and the 2D images make straightforward comparison of the image and constellation features impractical if not impossible, requiring the determination and assessment of candidate CMAPs (and associated candidate optical poses) which may be assessed for reasonableness via residual monitoring. However, a large set of candidate CMAPs may preclude precise, high confidence error bounding of candidate pose estimates. For example, loosening residual monitoring thresholds may result in an erroneous or infeasible CMAP (which may incorporate spurious or missed features) being found valid. Further, a broad scope of candidate pose solutions broadens the associated error bounds, which may in turn affect availability if a pose estimate associated with an erroneous or infeasible CMAP is unsuitable for target guidance applications. Alternatively, tightening residual monitoring thresholds may create an integrity issue by discarding a valid CMAP and pose estimate in favor of an inferior solution that may lead to failure to overbound pose error.

Model-based pose estimation may use the inherent constraints of physical modeling to determine a pose based on a given set of correspondences between 2D features detected within a captured image and 3D constellation features. However, these systems assume the pose estimate associated with a set of correspondences (e.g., a set associated with low residuals) is correct, rather than applying physical modeling to determine candidate correspondences or identify correspondence ambiguities. When searching for all feasible candidate correspondences between 2D image features and 3D constellation features, neglecting physical model constraints may require assessment of a set of candidates that may grow exponentially as the number of relevant features increases, to a computationally infeasible size. Random sampling approaches may attempt to alleviate this problem, but at the risk of missing or throwing out feasible correspondences that may still be correct; this may lead to a loss of system integrity or, at worst, the display of hazardously misleading information (HMI). Further, the selection of a single pose may overlook the issue of ambiguous candidate correspondences or involve the selection of an incorrect correspondence, which similarly may lead to a failure of system integrity.

Alternative approaches may estimate pose via machine learning (ML) algorithms. However, these approaches similarly forgo model-based constraints in favor of training ML algorithms according to a limited dataset, which in turn introduces an unobservable sampling bias. ML algorithm-based pose estimation additionally fails to provide a clear path to the high-confidence error bounding required by safety-critical applications.

SUMMARY

In a first aspect, a vision-based navigation system incorporating high-confidence error overbounding of multiple optical pose estimates is disclosed. In embodiments, the vision-based navigation system includes memory or other data storage for storing constellation database of three-dimensional (3D) constellation features (e.g., runway features, structures, lighting elements, fixtures), where each constellation feature is associated with a nominal 3D position relative to a constellation reference frame (e.g., an earth frame). The vision-based navigation system includes a camera or image sensor having a camera pose, e.g., a position and orientation of the camera relative to the constellation reference frame. The camera captures two-dimensional (2D) images of a target environment, e.g., a runway to which the aircraft is on approach and various runway features and markings corresponding to the constellation features. The vision-based navigation includes processors in communication with the camera and configurable via encoded instructions stored to the memory. The vision-based navigation system receives a set of candidate correspondences, where each candidate correspondence is a possible match between 2D image features detected in the captured images and 3D constellation features portrayed by the captured images. Each set of candidate correspondences includes one or more correspondence ambiguities, e.g., image features that may correspond to two or more different constellation features (but not both) or two or more image features that may correspond to a particular constellation feature. The vision-based navigation system estimates the camera pose relative to the constellation plane based on the set of candidate correspondences, where two or more different candidate pose solutions may each correspond to a set of candidate correspondences wherein one or more different correspondence ambiguities is assumed correct. The vision-based navigation system determines a viability threshold for each pose estimate or candidate pose solution, and eliminates any candidate pose solution below the viability threshold. Given the set of viable candidate pose solutions, the vision-based navigation system determines a conditional overbound (e.g., conditional pose error bound) for each candidate pose solution contingent on that pose solution being correct. Based on the set of individual conditional overbounds on each candidate pose solution, the vision-based navigation system determines a containment pose error overbound for a navigation solution based on the set of candidate pose solutions.

In some embodiments, the vision-based navigational system determines each candidate pose solution by generating a correspondence map (CMAP), or a set of candidate correspondences between image features and constellation features wherein one or more particular ambiguous correspondences are assumed to be the correct correspondences. The conditional pose error bound of the candidate pose solution is contingent on the validity of the ambiguous correspondence/s, e.g., if known.

In some embodiments, each candidate pose solution is based on a time of validity (e.g., a time associated with the captured image) and the vision-based navigational system eliminates non-viable candidate pose solutions based on auxiliary measurement data from an auxiliary measurement source having a known measurement error model.

In some embodiments, the auxiliary measurement source includes a dissimilar sensor and the auxiliary measurement data has a common time of validity with the candidate pose solution.

In some embodiments, the auxiliary measurement source includes an inertial navigation system (INS) or inertial measurement unit (IMU) configured for generating an inertial navigational solution, or the auxiliary measurement data may have a different time of validity and be propagated toward the time of validity of the candidate pose solution.

In some embodiments, the vision-based navigational system evaluates the containment pose error overbound on the set of candidate pose solutions based on required accuracy levels of the navigation solution, each accuracy level required for use of the navigation solution for flight operations performed or executed by aircraft-based guidance, navigation, or flight control systems and instruments. If the navigation solution is sufficiently accurate, the navigation solution and the containment pose error overbound are forwarded to the associated aircraft-based instruments or systems responsible for the flight operation.

In a further aspect, a method for high-confidence error overbounding of multiple candidate optical poses via a vision-based navigation system is disclosed. In embodiments, the method includes receiving a set of candidate correspondences between image features detected in two-dimensional (2D) images captured by an aircraft-based camera and three-dimensional (3D) constellation features (e.g., runway features, markings, fixtures) having nominal 3D positions relative to a constellation reference frame, the set of candidate correspondences including at least one ambiguous correspondence between image features and constellation features. The method includes determining a set of candidate pose solutions, each candidate pose solution an estimate of the optical pose of the camera relative to the constellation plane, based on a set of candidate correspondences where one or more of the ambiguous correspondences is assumed correct. The method includes determining a viability threshold for the resulting set of candidate pose solutions. The method includes eliminating as non-viable each candidate pose solution and associated set of candidate correspondences failing to meet the viability threshold. The method includes determining a conditional pose error bound for each remaining viable candidate pose solution. The method includes determining, based on the set of conditional pose error bounds, a containment pose error bound on a navigation solution based on the set of viable candidate pose solutions (wherein, e.g., at least one candidate pose solution is the correct one).

In some embodiments, the method includes determining a candidate pose solution by generating a correspondence map (CMAP), e.g., a map of correspondences between image features and constellation features wherein at least one particular ambiguous correspondence is assumed to be correct.

In some embodiments, each candidate pose solution is associated with a time of validity (e.g., a time of the image capture), and the method includes receiving auxiliary measurement data from an auxiliary measurement source having a known measurement error model, and eliminating at least one non-viable candidate pose solution based on the auxiliary measurement data.

In some embodiments, the method includes receiving auxiliary measurement data as dissimilar sensor data sharing the time of validity and reported by a dissimilar sensor.

In some embodiments, the method includes receiving auxiliary measurement data having a different time of validity and propagated toward the time of validity associated with the candidate pose solution.

In some embodiments, the method further includes evaluating the containment pose error bound of the set of viable candidate pose solutions based on accuracy levels of the navigation solution, each accuracy level required by a flight operation performed or executed by an aircraft-based guidance, navigation, or flight control system or instrument and, when the navigation solution is sufficiently accurate, forwarding the navigation solution and/or the containment pose error bound to the aircraft-based instruments or systems responsible for the flight operation.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 9A and 9B are flow diagrams illustrating a method for high-confidence error bounding of multiple optical pose estimates by an aircraft-based vision-based navigation system according to example embodiments of this disclosure.

DETAILED DESCRIPTION

Figure 1:
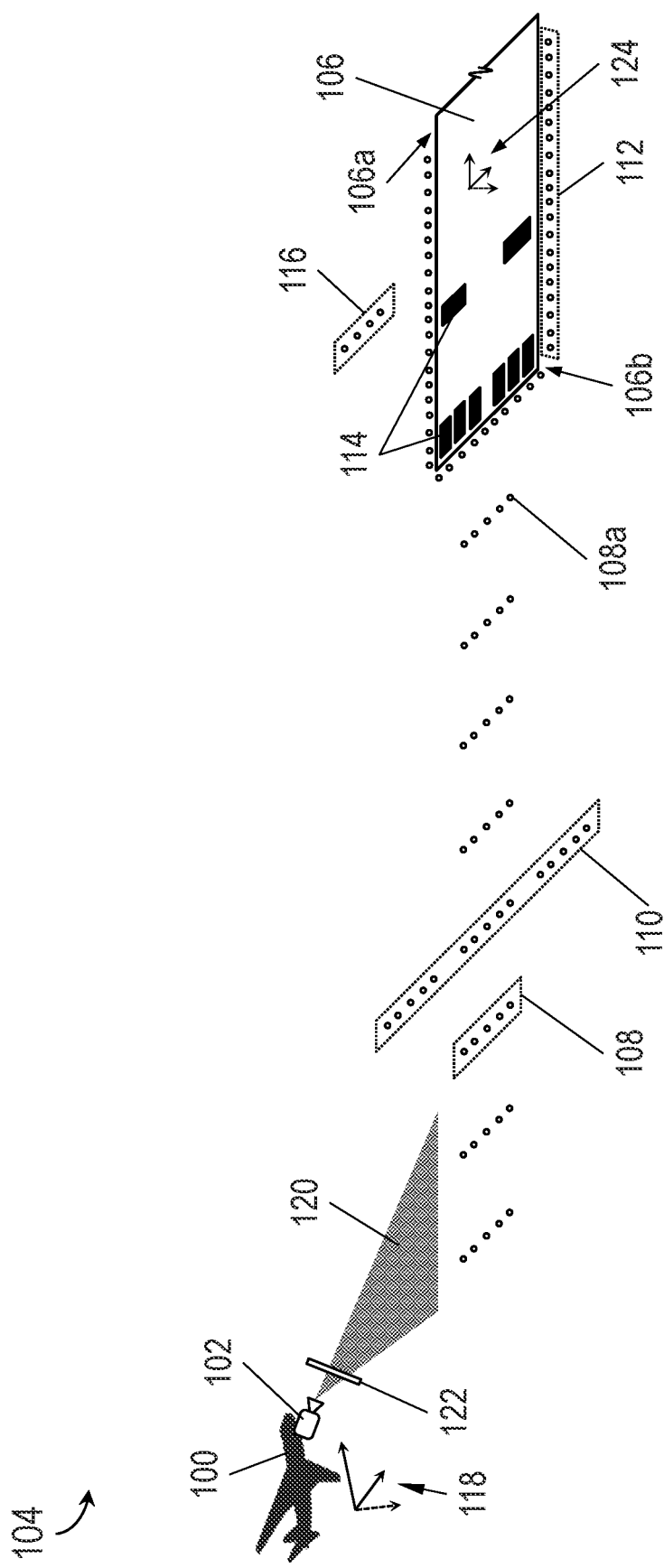
FIG. 1 is a diagrammatic illustration of a runway environment and an aircraft on approach to said runway environment according to with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIG. 1—System Generally

Broadly speaking, embodiments of the inventive concepts disclosed herein are directed to a vision-based navigation system and method capable of high-confidence position overbounding in the presence of known ambiguities with respect to image-to-world correspondence enabling a high-confidence estimate of a camera (e.g., or aircraft) pose relative to a target environment, e.g., a runway to which the aircraft is on approach. For example, U.S. patent application Ser. No. 17/573,283, which is herein incorporated by reference in its entirety, provides that captured two-dimensional (2D) images of the target environment may be orthocorrected according to an a priori orientation estimate, such that the relationship between image reference frame and environment reference frame reduces approximately to a similarity transform, allowing for more accurate detection of environmental elements corresponding to detected image features. Further, the orthocorrected image features may be bounded by an error bound on the orientation estimate, allowing for identification of correspondence ambiguities between image features and environmental features. Alternatively, three-dimensional (3D) constellation features, or the actual runway features and fixtures portrayed by the 2D captured images, may be reprojected from their 3D constellation plane (e.g., an earth reference frame) into the 2D image plane of the captured images (e.g., provided the orientation estimate incorporates sufficient degrees of freedom). In embodiments, the resulting correspondence maps (CMAP) of image features to corresponding constellation features may be the basis of a high confidence estimate of the optical pose of the camera relative to the constellation plane, which in turn may be the basis of a navigation solution used by other aircraft-based guidance applications.

However, in some embodiments it may still be impossible to establish within a CMAP a perfect one-to-one correspondence between 2D image features detected in the captured image and the 3D constellation features portrayed by the captured image without some degree of ambiguous correspondence. For example, a detected image feature may correspond to one of two or more different constellation features; while one (and only one) possible correspondence (or set of correspondences) between image features and constellation features is the correct one, there may be insufficient information to determine with enough confidence which correspondence or set is the correct one.

Accordingly, embodiments of the inventive concepts disclosed herein are directed to determining containment pose error bounds for a set of image-to-world correspondences (and the associated estimated optical pose solutions based thereon) where ambiguous correspondences cannot be eliminated, e.g., without the risk of discarding a valid correspondence and its associated correct optical pose estimate. For example, high-confidence overbounding may establish, with accuracy sufficient for use of navigation solutions based on the set of candidate pose solutions by flight operations performed by aircraft-based flight control systems (FCS), navigation systems, flight guidance systems (FGS), and/or other instruments, systems, and applications in guiding the aircraft through approach and landing.

Referring to FIG. 1, an aircraft 100 is disclosed. The aircraft may incorporate an onboard camera 102 and may be traversing a runway environment 104 on approach to a runway 106. The runway environment 104 may further include, in addition to the runway 106, runway features including, but not limited to: runway approach lightbars 108 (including individual lighting elements 108a), runway approach crossbars 110, runway edge lighting 112, runway markings 114, and/or indicator lighting 116, e.g., precision approach path indicator (PAPI) lighting, visual approach slope indicator (VASI) lighting, and other lighting configured to provide approach guidance information to the aircraft 100.

In embodiments, the camera 102 may be mounted to the aircraft 100 according to a known camera model. For example, the camera 102 may be mounted to the aircraft 100 at a fixed orientation relative to the platform frame 118, e.g., a frame of reference corresponding to the aircraft 100. In some embodiments the camera 102 may be capable of movement relative to the aircraft 100, such that the camera model accounts for relative optical position and orientation (optical pose) of the camera relative to the aircraft and/or the platform frame 118. In embodiments, the camera 102 may capture images (e.g., streaming images) of the runway environment 104 within the frustum 120 of the camera. For example, captured images may provide two-dimensional (2D) visual information corresponding to the runway environment 104 relative to an image plane 122, e.g., wherein the image corresponds to a 2D pixel array (x*y) and wherein pixel subsets of the image may depict the runway 106 and/or runway features, or portions thereof as seen by the camera 102 in the image plane.

In embodiments, each runway feature ("constellation features", e.g., runway approach lightbars 108, individual lighting elements 108a, runway approach crossbars 110, runway edge lighting 112, runway markings 114, and/or indicator lighting 116), in addition to aspects of the runway 106 itself (e.g., runway edges 106a, runway corners 106b) may be associated with a fixed nominal three-dimensional (3D) position relative to a constellation plane 124 (e.g., constellation plane, runway reference frame, usually with a known relation to a local-level navigation frame).

Figure 2:
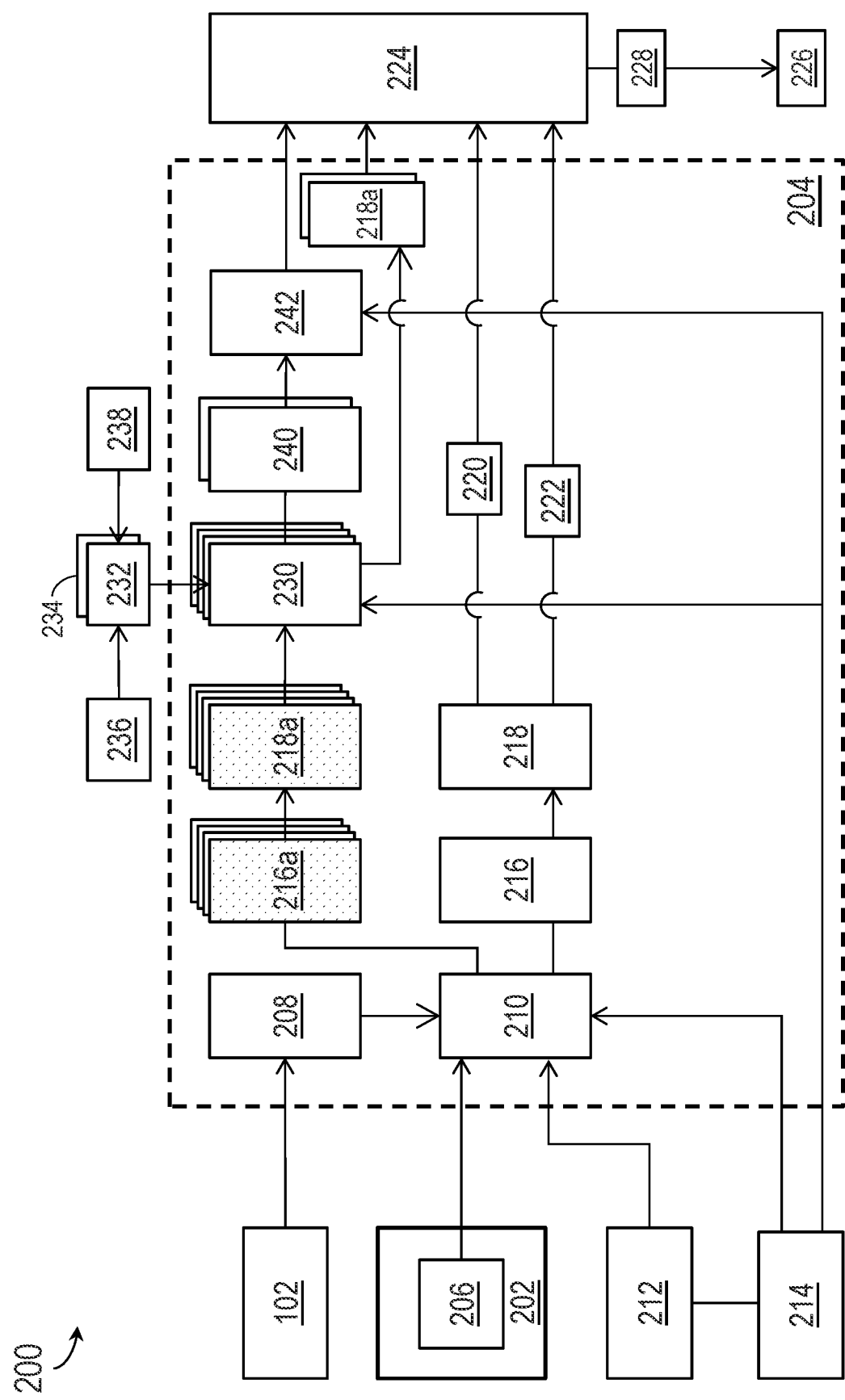
FIG. 2 is a block diagram for a vision-based navigation system incorporating high confidence error bounding of multiple optical pose estimates according to example embodiments of this disclosure.

FIG. 2—Vision-Based Navigation System

Referring now to FIG. 2, a vision-based navigation system 200 is disclosed.

The vision-based navigation system 200 may be embodied aboard the aircraft (100, FIG. 1) and may include the camera 102, memory 202 or any other appropriate data storage means as is known, and processors 204 (e.g., one or more processors, including cores, partitions, or other virtualized portions thereof). The memory 202 may include encoded instructions executable by the processors 204 as well as a constellation database 206 corresponding to the runway environment (104, FIG. 1).

In embodiments, for each runway environment 104, a corresponding constellation database 206 may include 3D position information in the constellation plane (124, FIG. 1) for each constellation feature (e.g., "runway features" including, but not limited to: runway approach lightbars (108, FIG. 1), individual lighting elements (108a, FIG. 1), runway approach crossbars (110, FIG. 1), runway edge lighting (112, FIG. 1), runway markings (114, FIG. 1), and/or indicator lighting (116, FIG. 1)).

In embodiments, image processing and feature detection may receive and analyze images captured by the camera 102 to detect image features 208 corresponding to the runway features. For example, image processing/feature detection may detect image features 208 including, e.g., points, edges, corners, light areas, dark areas, and/or other portions of an image. Each image portion may be associated with an array or group of pixels having a position relative to the image plane (122, FIG. 1) and potentially indicative of one or more runway features (e.g., based on shape, luminous intensity, position or angle relative to other image portions, and/or other relative factors).

In embodiments, high-confidence candidate correspondence determination modules 210 may receive the detected image features 208 and may access the constellation database 206 in order to determine correspondences between 2D detected image features and the real-world 3D constellation features portrayed by the captured images. For example, as disclosed in U.S. patent application Ser. No. 17/573,283, herein incorporated by reference in its entirety, the candidate correspondence determination modules 210 may align the image plane 122 and the constellation plane 124 into a common domain via one or more of: 1) orthocorrection of detected image features 208 from the image plane to the constellation plane (e.g., based on inputs 212 including an orientation estimate (e.g., roll/pitch) determined by other aircraft-based navigation systems and including an error model 214); and/or 2) reprojection of constellation features from the constellation database 206 into the image plane (e.g., based on inputs 212 and associated error models 214 including an estimate of the pose of the camera 102 relative to the constellation plane in at least six degrees of freedom (6 DoF)).

In embodiments, when the orientation between the image plane 122 and constellation plane 124 is thus resolved into a common domain, the relationship between a 3D constellation point or feature in the constellation plane and a corresponding point or feature in the 2D image is a similarity transformation. For example, image patterns and constellation patterns may be identical except for changes in scale, in-plane shifts, and in-plane rotations. Relative distance and angles, however, may be invariant between image patterns and constellation patterns, and may be used to match constellation patterns to image patterns within relatively tight tolerances. Similarly, the estimated orientation between the image plane 122 and constellation plane 124 may be error-bounded with high confidence based on the error models 214 or error bounds associated with the orthocorrection or reprojection inputs 212.

In embodiments, the candidate correspondence determination modules 210 may attempt to match constellation features to image features 208, resulting in a candidate correspondence map 216 (CMAP), e.g., a set of candidate correspondences between image and constellation features. For example, under ideal conditions the candidate CMAP 216 may map each image feature (e.g., or a group thereof) to a corresponding constellation feature/s to a desired confidence level; the higher the confidence level, the lower the likelihood of correspondence ambiguity.

In embodiments, the vision-based navigation system 200 may estimate (218) the optical pose of the camera 102 relative to the constellation plane 124 based on the candidate CMAP 216. For example, a candidate pose estimate 220 (e.g., an estimate in at least six degrees of freedom (6 DoF) of the optical pose of the camera in the constellation plane) having a sufficiently high-confidence error bound 222 may be forwarded to application adapters 224 for use in the performance and execution of flight operations by aircraft-based instruments or systems 226, e.g., flight control systems (FCS), flight guidance systems (FGS), navigation systems and other like instruments or systems aboard the aircraft 100. If the high-confidence error bound corresponds to accuracy of the candidate pose estimate 220 sufficient for a particular flight operation or operations, the application adapters 224 may transform the candidate pose estimate into guidance cues and/or navigation solutions 228 for use by the responsible aircraft-based instruments or systems 226.

However, in embodiments the CMAP 216 may include correspondence ambiguities as described above, e.g., ambiguous correspondences between a detected image feature 208 and one or more constellation features to which the image feature may correspond, but for which there may be insufficient information to determine with a desired level of confidence precisely to which constellation feature/s the image feature corresponds. (Similar ambiguous correspondences may occur with respect to a constellation feature and one or more image features.) In order to preserve the integrity of the vision-based navigation system 200, a candidate pose estimate 220 based on the CMAP 216 must either exclude, or account for, any such correspondence ambiguities.

In some embodiments, the vision-based navigation system 200 may generate a candidate pose estimate 220 to a desired confidence level (and/or to a required level of accuracy of the associated navigation solution, as required by various flight control, navigation, and/or guidance operations) when all correspondence ambiguities have been excluded from the CMAP 216. However, with respect to some CMAP, it may prove impossible to generate an adequate candidate pose estimate 220 without resolving one or more such correspondence ambiguities.

Accordingly, in embodiments the vision-based navigation system 200 may address unavoidable correspondence ambiguities within a generated CMAP 216 via high-confidence containment bounding of multiple candidate pose solutions. For example, given a CMAP 216 (or a corresponding set of candidate correspondences between detected image features 208 and constellation features) including one or more correspondence ambiguities, the vision-based navigation system 200 may generate a set of candidate correspondence maps 216a, each candidate CMAP 216a including a full set of candidate correspondences where at least one correspondence ambiguity is presumed to be the correct correspondence. Each candidate CMAP 216a may resolve the correspondence ambiguities within the CMAP 216 in a unique way (e.g., by eliminating the correspondence ambiguities entirely, or by assuming the validity of a particular candidate correspondence or set thereof). In embodiments, the vision-based navigation system 200 may generate a set of candidate pose solutions 218a, each candidate pose solution based on a candidate CMAP 216a.

In embodiments, the vision-based navigation system 200 may evaluate (230) the set of candidate pose solutions 218a, e.g., via statistical hypothesis, to assess whether each candidate pose solution 218a is feasible or viable and eliminate any candidate pose solution failing to meet a predetermined viability threshold. For example, the vision-based navigation system 200 may generate a set of four candidate CMAPs 216a, the evaluation 230 of which may eliminate two candidate CMAPs as non-viable. In some embodiments, the vision-based navigation system 200 may eliminate non-viable or non-feasible candidate CMAPs 216a based on auxiliary measurement data 232 and containment bounds 234 and/or error models associated therewith. For example, the vision-based navigation system 200 may preserve high confidence error bounding by ensuring that no candidate pose solution 218a (and corresponding candidate CMAP 216a) is discarded from consideration unless it is sufficiently improbable compared to a desired system integrity failure rate. Accordingly, within acceptable bounds the risk of inadvertently discarding a correct pose solution is eliminated. In embodiments, the auxiliary measurement data 232 may include measurements from a dissimilar sensor (236), e.g., an absolute positioning sensor, inertial navigation system or instrument landing system (ILS), altimeter (e.g., radio alt, baro alt), magnetometer, or other like sensor having a common time of validity with the images captured by the camera 102 upon which the candidate CMAP 216a is based. In some embodiments, auxiliary measurement data 232 may be associated with a different time of validity and propagated toward to the time of validity associated with the candidate CMAP 216a, e.g., by the measuring inertial navigation system 238 (INS), inertial measurement unit (IMU), ILS, or other like measuring system.

In embodiments, the vision-based navigation system 200 may generate an individual conditional pose error overbound 240 for the candidate pose solution 218a associated with each remaining viable candidate CMAP 216a. For example, each individual conditional pose error overbound 240 may overbound error in the candidate pose solution 218a contingent on the corresponding candidate CMAP 216a being correct (i.e., that the correspondence ambiguity within a given candidate CMAP is the correct correspondence).

In embodiments, based on the set of individual conditional pose error overbounds 240, the vision-based navigation system 200 may generate a high-confidence containment pose error bound 242 on the set of candidate pose solutions 218a bounded by the individual conditional pose error overbounds and corresponding to the set of viable candidate CMAPs 216.

In embodiments, the guidance/navigation application adapters 224 may evaluate the high-confidence containment pose error bound 242 based on accuracy or confidence levels of a navigation solution associated with the set of viable candidate CMAPs 216a required for use of the navigation solution in the performance or execution of flight operations by aircraft-based instruments or systems 226. If, for example, the containment pose error bound 242 meets or exceeds an accuracy of the associated navigation solution required for a particular flight operation or operations, the set of candidate pose estimates 218a within the containment pose error bound 242 may be transformed by the application adapters 224 into lateral (LAT) deviations, vertical (VERT) deviations, or other guidance cues or navigation solutions 228 for use in the performance of said flight operations by the responsible instruments and/or control systems 226 aboard the aircraft 100.

Figure 3:
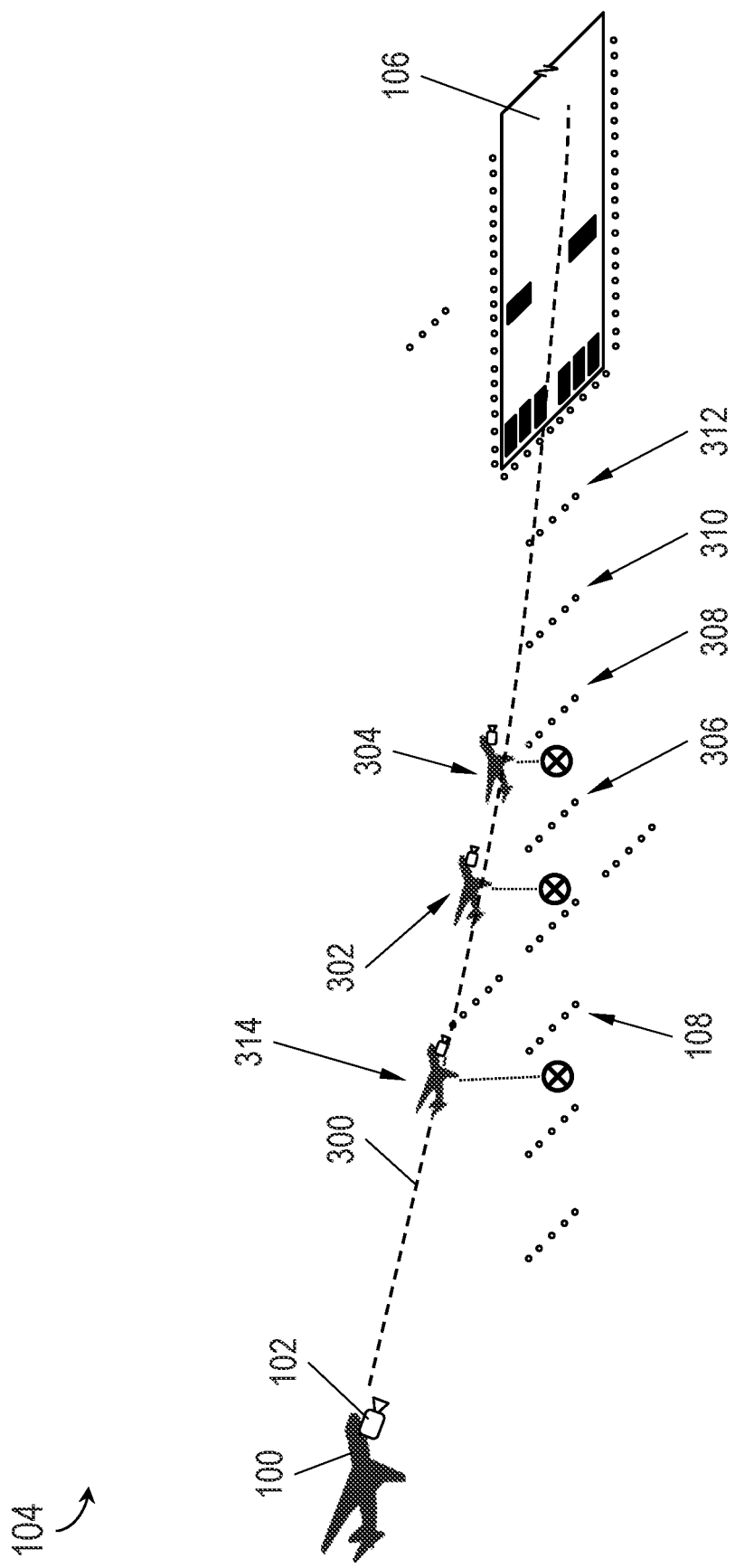
FIG. 3 is a diagrammatic illustration of the aircraft and vision-based navigation system of FIG. 2 and the runway environment of FIG. 1.
Figure 4A:
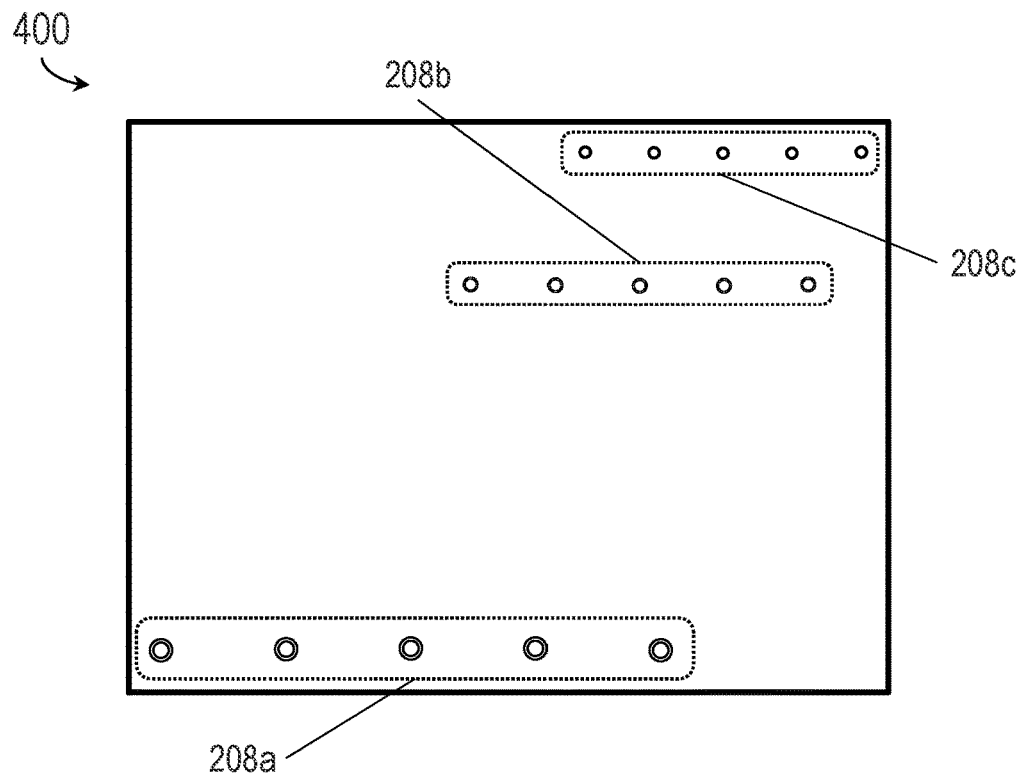
FIGS. 4A and 4B are images of the runway environment of FIG. 1 as captured by the aircraft of FIG. 3.
Figure 4B:
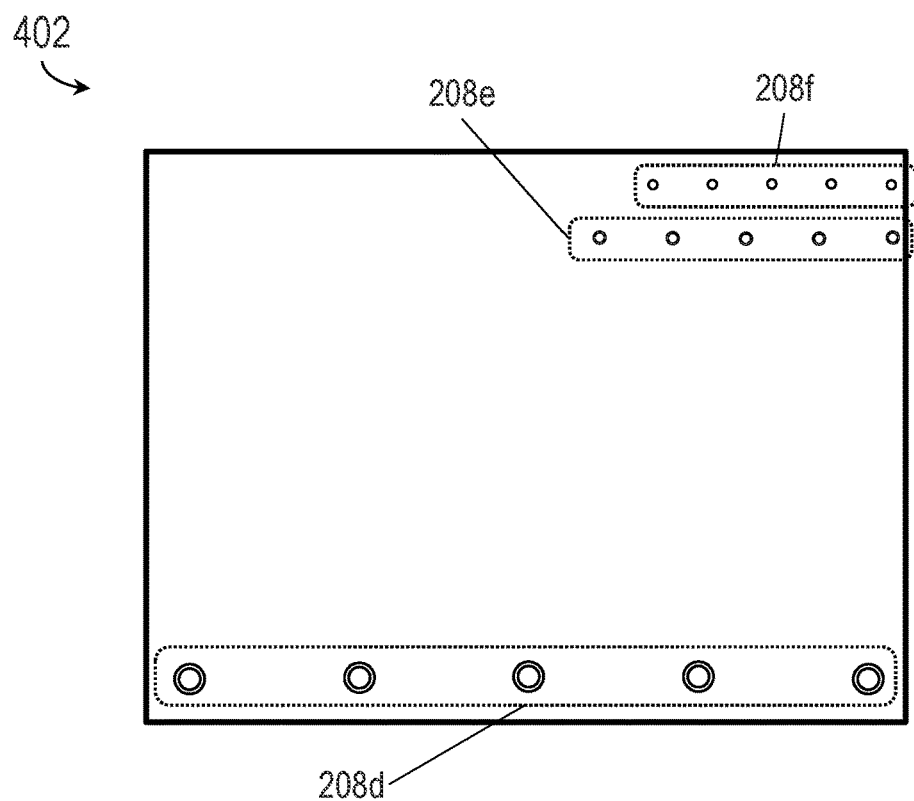

FIGS. 3, 4A, and 4B—The Ambiguity Problem

Referring now to FIG. 3, the runway environment 104 is shown. The runway environment 104 may additionally include an approach path 300 of the aircraft 100, a first optical pose 302 and a second optical pose 304 of the camera 102 with respect to the constellation plane (124, FIG. 1), and runway approach lightbars 306, 308, 310, 312, which may be implemented and may function similarly to the runway approach lightbar 108 but for their location.

In embodiments, the camera 102 may continue to capture 2D images of the runway environment 104 as the aircraft 100 descends through its approach path 300 toward the runway 106. For example, the aircraft 100 may pass through a first optical pose 302 and a second optical pose 304 along the approach path 300 to the runway 106. Each of the first optical pose 302 and the second optical pose 304 may represent a particular position and orientation of the camera 102 relative to the constellation plane (124, FIG. 1), and therefore of the aircraft 100 to which the camera is fixed.

Referring also to FIGS. 4A and 4B, the captured images 400 and 402 are shown.

In embodiments, the captured images 400 and 402 may respectively correspond to images captured by the camera 102 at positions and orientations of the aircraft 100 corresponding to the first optical pose 302 and the second optical pose 304. For example, the captured image 400 may portray three detectable image features 208a, 208b, 208c, and the captured image 402 may portray three detectable image features 208d, 208e, 208f, in similar, if not precisely identical, positions and orientations relative to the image plane (122, FIG. 1), although the first and second optical poses 302, 304 may be separated by over 200 feet.

As can be seen with reference to FIG. 3, the image features 208a-208c detected within the captured image 400 (captured from the first optical pose 302) may clearly correspond respectively to the runway approach lightbars 306, 308, 310. Similarly, the image features 208d-208f detected within the captured image 402 (captured from the second optical pose 304) may correspond respectively to the runway approach lightbars 308, 310, 312. If the vision-based navigation system 200 were able to determine with sufficient accuracy and confidence the correct correspondence between the detected image features 208a-208c and the constellation features to which these image features correspond (e.g., the runway approach lightbars 306, 308, 310), it would be possible to estimate (e.g., via one or more of orthocorrection or reprojection to align the image plane (122, FIG. 1) of the detected image features and the constellation plane (124, FIG. 1) of the runway approach lightbars into a common domain) the first optical pose 302 with high confidence based on the nominal 3D positions of each runway approach lightbar.

In embodiments, given the similarly of the captured images 400, 402, the vision-based navigation system 200 may not have sufficient additional information to determine, with respect to the captured image 400, the precise constellation features (e.g., runway approach lightbars 306, 308, 310) to which the detected image features 208a-208c correspond. For example, with respect to the captured image 400, the vision-based navigation system 200 may generate two candidate CMAPs (216a): a first candidate CMAP may presume a correspondence between the image features 208a, 208b, 208c and the respective runway approach lightbars 306, 308, 310, and a second candidate CMAP may presume a correspondence between the image features 208a, 208b, 208c and the respective runway approach lightbars 308, 310, 312.

In embodiments, the vision-based navigation system 200 may generate a first candidate pose solution (218a, FIG. 2) corresponding to an estimate of the first optical pose 302 based on the first candidate CMAP 216a and its correspondence of the image features 208a-208c to the respective runway approach lightbars 306, 308, 310. Similarly, the vision-based navigation system 200 may generate a second candidate pose solution 218a corresponding to an estimate of the first optical pose 302 based on the second candidate CMAP 216a and its correspondence of the image features 208a-208c to the respective runway approach lightbars 308, 310, 312.

It can clearly be seen above (see, e.g., FIG. 3) that the first candidate CMAP correctly resolves the ambiguous correspondence of the image features 208a-208c and the second candidate CMAP does not, but the vision-based navigation system 200 may not have sufficient information to reach this conclusion to a sufficient confidence level that the associated candidate pose solution 218a or navigation solution is sufficiently accurate for use in the execution or performance of flight operations by aircraft-based instruments and systems (226, FIG. 2). Accordingly, in embodiments the vision-based navigation system 200 may evaluate each of the candidate CMAPs 216a for viability. For example, the vision-based navigation system 200 may consider inertial navigation solutions or other auxiliary measurement data (232, FIG. 2) captured by dissimilar sensors (236, FIG. 2) sharing a common time of validity with the captured image 400 captured by the camera 102.

Alternatively or additionally, in embodiments the vision-based navigation system 200 may propagate a high-confidence optical pose estimate (220, FIG. 2) associated with a different time of validity toward the time of validity of interest (e.g., a time of validity corresponding to the capture of the captured image 400) to eliminate any inconsistent candidate pose estimates 218a. For example, a prior estimate of the optical pose of the camera 102 with respect to the constellation plane 124 may correspond to the prior optical pose 314. As can be seen with reference to FIG. 3, the prior optical pose 314 may be associated with a CMAP 216 wherein a detected image feature 208 corresponds to the runway approach lightbar 108. Accordingly, any forward inertial propagation of the prior optical pose 314 (e.g., from the prior time of validity to the time of validity associated with the captured image 400) may likely eliminate as infeasible any candidate CMAP 216a including a correspondence between any detected image feature and the runway approach lightbar 108, as given the velocity of the aircraft 100 the runway approach lightbar 108 would be presumed behind any position of the aircraft at the time of validity associated with the captured image 400. However, neither current candidate CMAP 216a may include an image feature 208 corresponding to the runway approach lightbar 108, so both candidate CMAPs, correct and incorrect, may be retained as too feasible to discard (e.g., there may remain a nonzero and non-negligible probability within acceptable bounds that the incorrect candidate CMAP is correct).

Figure 5:
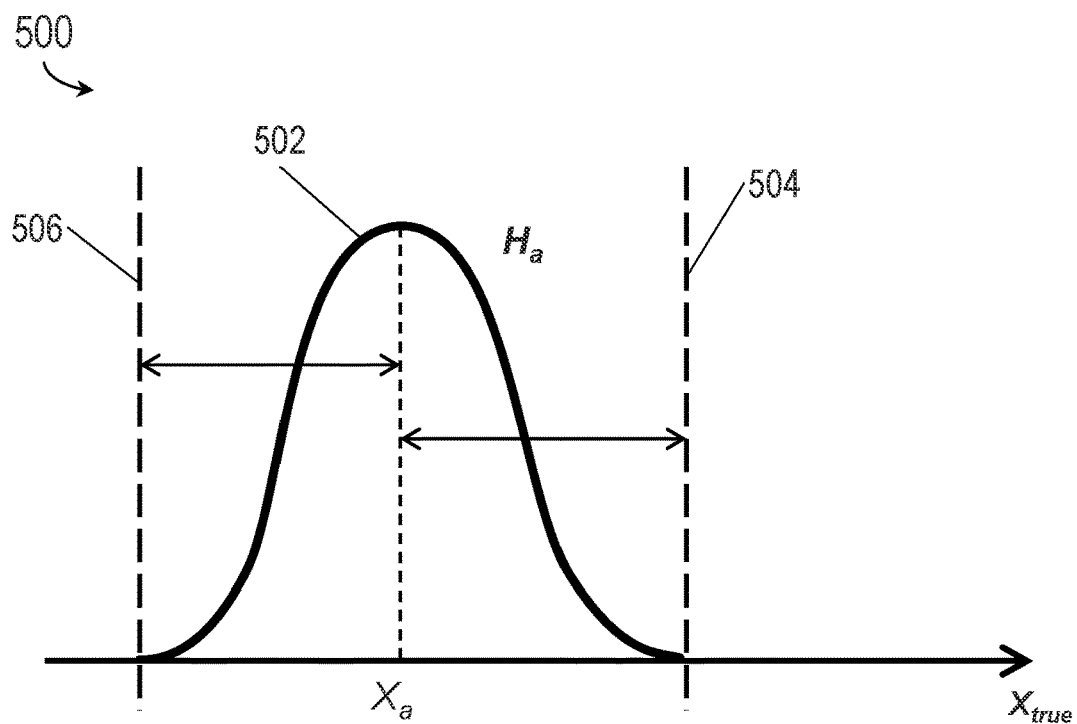
FIGS. 5 and 6 illustrate individual single-pose conditional error bounds of candidate optical pose estimates by the vision-based navigation system of FIG. 2.
Figure 6:
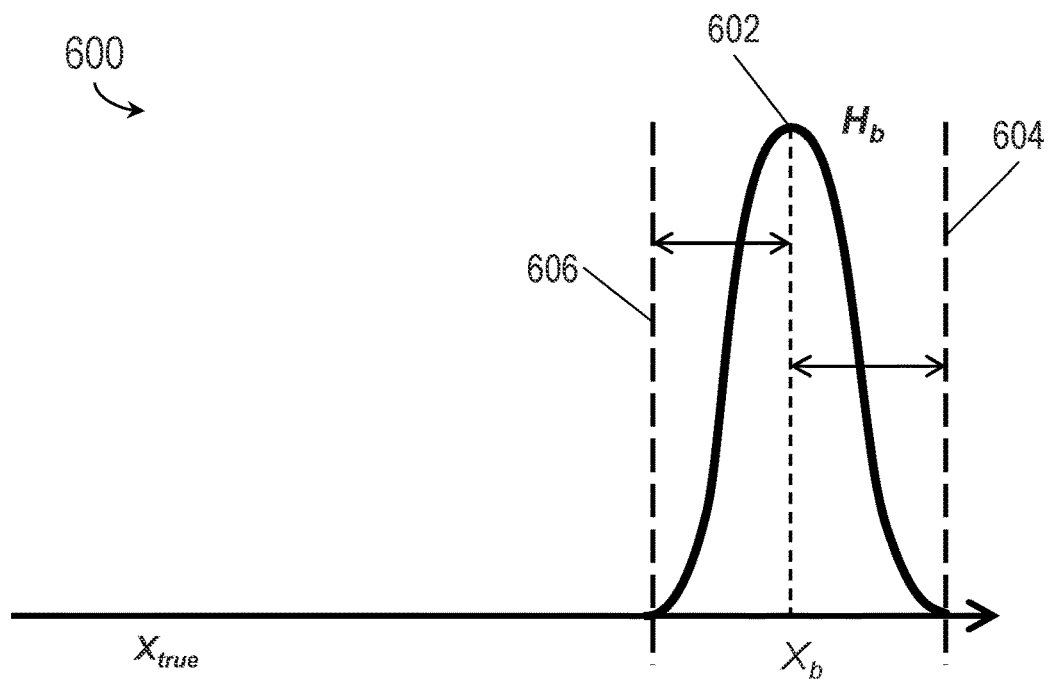
Figure 7:
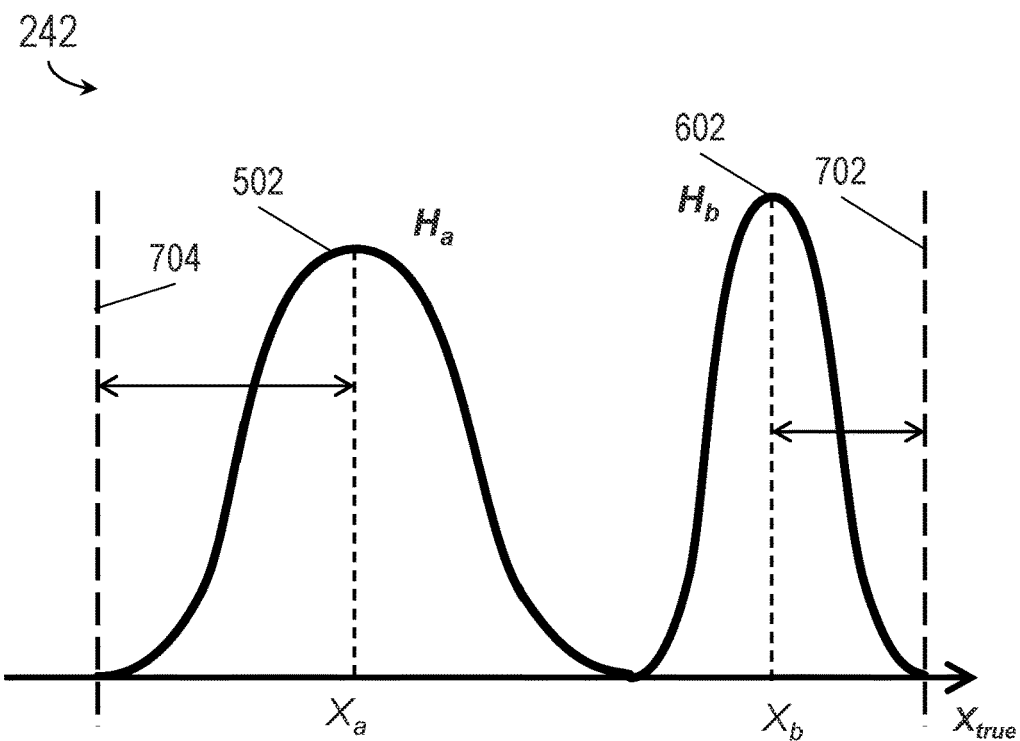
FIGS. 7 and 8 illustrate a multiple-pose containment error bound determined by the vision-based navigation system of FIG. 2 based on the individual conditional error bounds of FIGS. 5 and 6.

FIGS. 5 Through 7—Single-Pose and Multiple-Pose Bounds

Referring to FIGS. 5 and 6, the standard error distributions 500 and 600 are shown.

In embodiments, the vision-based navigation system 200 may construct individual conditional pose error overbounds 502, 602 for candidate pose estimates $X_a$, $X_b$ (218a, FIG. 2), each individual conditional pose error overbound based respectively on a hypothesis $H_a$, $H_b$ that the candidate CMAP (216a, FIG. 2) associated with each candidate pose estimate $X_a$, $X_b$ is correct. For example, referring also to FIG. 3 above, the candidate pose estimate $X_a$ may be an estimate of the optical pose of the camera (102, FIG. 1) relative to the constellation plane (124, FIG. 1) based on a candidate CMAP 216a resolving a correspondence ambiguity by corresponding the detected 2D image features (208a-208c, FIG. 4A) to the respective runway approach lightbars 306, 308, 310 (FIG. 3), and the hypothesis $H_a$ may hypothesize that this correspondence, and therefore the associated candidate CMAP and candidate pose estimate based thereon, is correct. Similarly, the candidate pose estimate $X_b$ may be an estimate of the optical pose of the camera 102 relative to the constellation plane 124 based on a candidate CMAP 216a resolving the correspondence ambiguity by corresponding the detected 2D image features 208a-208c (FIG. 4B) to the respective runway approach lightbars 308, 310, 312, and the hypothesis $H_b$ may hypothesize that (contrary to the hypothesis $H_a$) this correspondence, and therefore the associated candidate CMAP and candidate pose estimate based thereon, is instead the correct correspondence. In embodiments, the individual conditional pose error overbounds 502 (e.g., including conditional upper bound 504 and conditional lower bound 506) and 602 (e.g., including conditional upper bound 604 and conditional lower bound 606) may be constructed as disclosed by U.S. Pat. No. 10,909,715, which is herein incorporated by reference in its entirety and discloses error overbounding for optical pose estimates.

Referring also to FIG. 7, a high-confidence multiple-pose containment error bound 242 is shown.

In embodiments, the multiple-pose containment error bound 242 may comprise the individual conditional pose error overbounds 502, 602 corresponding to the candidate pose estimates $X_a$, $X_b$ (218a) and associated hypotheses $H_a$, $H_b$ that the respective candidate CMAP 216a and candidate pose estimate 218a associated with each proposed resolution of the correspondence ambiguity (e.g., as shown by FIGS. 3 through 4B above) is correct. Accordingly, the multiple-pose containment error bound 242 may incorporate a multiple-pose upper bound 702 and a multiple-pose lower bound 704 on the probability of either hypothesis $H_a$, $H_b$ and its corresponding candidate pose estimate $X_a$, $X_b$ being correct. For example, the respective probability of each hypothesis $H_a$, $H_b$ and its corresponding candidate pose estimate $X_a$, $X_b$ being correct may, or may not, be known.

In embodiments, if the probability of each hypothesis $H_a$, $H_b$ and its corresponding candidate pose estimate $X_a$, $X_b$ being correct is known (e.g., or bounded by the respective upper bounds 504, 604 and lower bounds 506, 606 of each individual conditional pose error overbound 502, 602), and the respective candidate CMAPs 216a are disjoint (e.g., one, and only one, candidate CMAP and associated candidate pose estimate is true), the multiple-pose containment error bound 242 may be achieved by, for example, applying the law of total probability to the probability of exceeding the multiple-pose upper bound 704. Alternatively, if the probability of each hypothesis $H_a$, $H_b$ and its corresponding candidate pose estimate $X_a$, $X_b$ being correct is not known, a conservative multiple-pose containment error bound 242 may be achieved by, for example, assigning a probability of 1 to the candidate pose estimate $X_a$, $X_b$ capable of creating the broadest possible multiple-pose upper bound 702 and multiple-pose lower bound 704.

Figure 8:
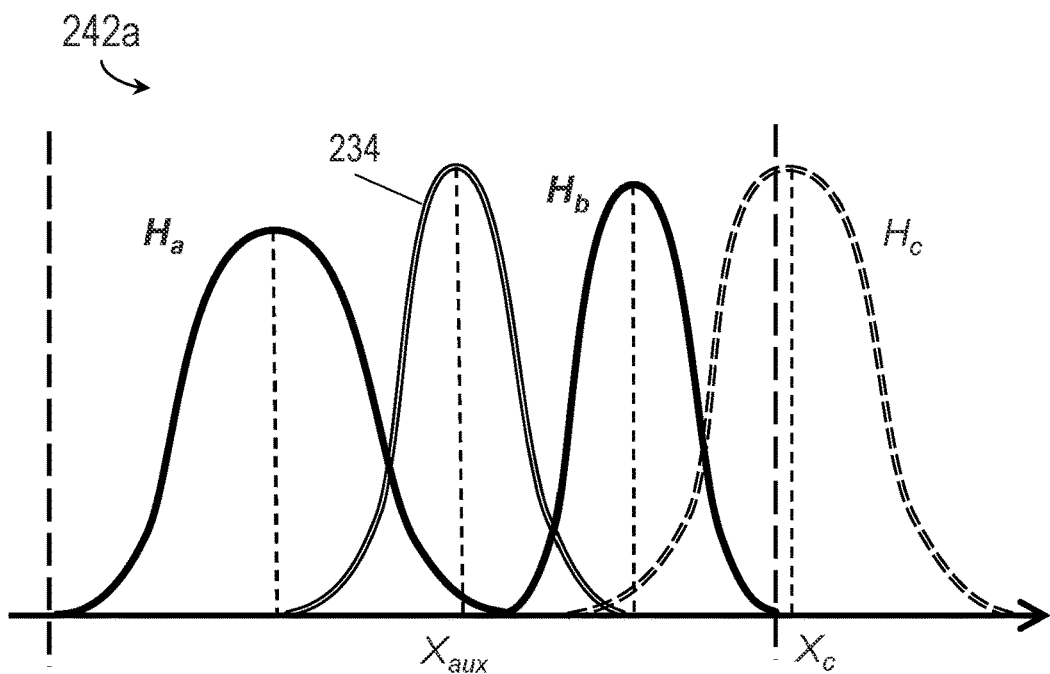

FIG. 8—Eliminating Nonviable Poses

Referring also to FIG. 8, the multiple-pose containment error bound 242a is shown.

In embodiments, the multiple-pose containment error bound 242a may be implemented and may function similarly to the multiple-pose containment error bound 242 shown by FIG. 7, except that the multiple-pose containment error bound 242a may include an additional hypothesis $H_c$ and corresponding candidate pose estimate $X_c$ (218a, FIG. 2) as well as an additional error function (e.g., containment error bound 234) associated with auxiliary measurement data $X_{aux}$ (232, FIG. 2). In embodiments, the hypothesis $H_c$ and corresponding candidate pose estimate $X_c$ may resolve correspondence ambiguities (e.g., as shown by FIGS. 4A and 4B) via a different correspondence of the 2D image features 208a-208c (FIG. 4A) to 3D constellation features (e.g., runway approach lightbars 108, 306, 308, 310, 312 (FIG. 3)). For example, the hypothesis $H_c$ and corresponding candidate pose estimate $X_c$ may correspond to a candidate CMAP (216a, FIG. 2) wherein a 2D image feature 208a-208c detected within the captured image (400, FIG. 4A) corresponds to the runway approach lightbar 108.

In embodiments, the auxiliary measurement data $X_{aux}$ may include, but is not limited to, dissimilar sensor data (236, FIG. 2) or inertial navigation solutions with a common time of validity to the captured image 400, or auxiliary measurement data (232, FIG. 2) associated with a different time of validity and propagated in time (e.g., by the measuring INS (238, FIG. 2) toward the time of validity associated with the captured image 400. For example, if the candidate hypothesis $H_c$ and corresponding candidate pose estimate $X_c$ are inconsistent with the auxiliary measurement data $X_{aux}$, the vision-based navigation system (200, FIG. 2) may eliminate the candidate pose estimate $X_c$ and its associated candidate CMAP 216a as non-viable or non-feasible.

Figure 9A:
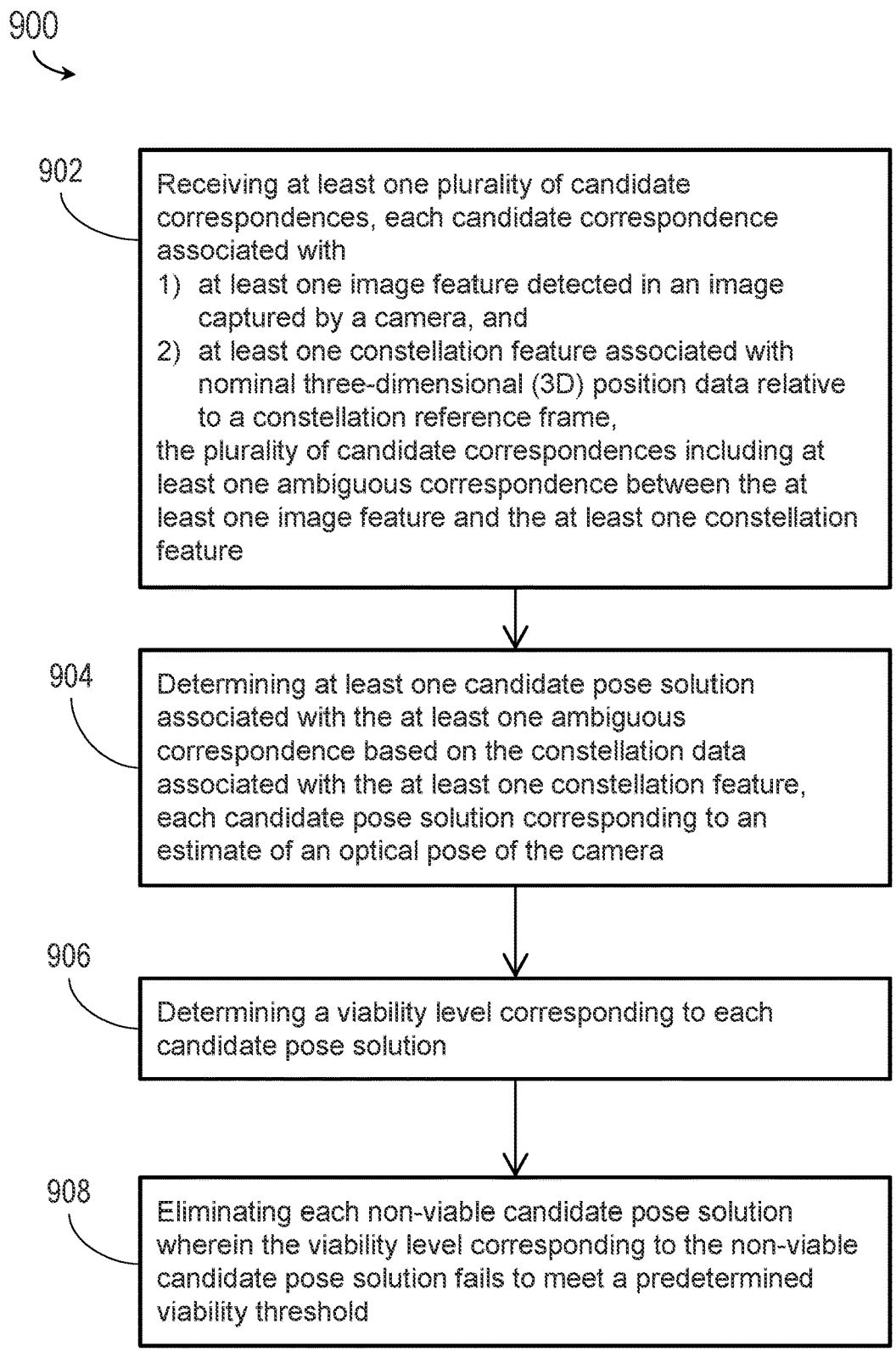

FIGS. 9A/9B—Method

Referring now to FIG. 9A, a method 900 for high-confidence error overbounding of multiple candidate optical poses may be implemented by the aircraft-based vision-based navigation system 200 and may include the following steps.

At a step 902, the vision-based navigation system receives a set of candidate correspondences between image features detected in 2D images captured by a camera (associated with an image reference frame) and 3D constellation features (e.g., runway features) having nominal 3D positions in a constellation reference frame. The camera further has an optical pose relative to the constellation plane. The set of candidate correspondences includes at least one correspondence ambiguity, e.g., an ambiguous correspondence between one or more image features and one or more constellation features.

At a step 904, the vision-based navigation system determines a set of candidate pose solutions based on the set of candidate correspondences, each candidate pose solution estimating the optical pose of the camera relative to the constellation plane. For example, each candidate pose solution corresponds to a candidate correspondence map (CMAP) based on the set of candidate correspondences, each candidate CMAP including unambiguous correspondences of image features to constellation features and resolving the correspondence ambiguity via a candidate correspondence (or set of candidate correspondences) assumed to be correct in determining the candidate pose solution.

At a step 906, the vision-based navigation system determines a viability or feasibility level for each candidate pose solution.

At a step 908, the vision-based navigation system eliminates any candidate pose solution and corresponding CMAP whose viability level fails to meet a viability threshold. For example, the vision-based navigation system may receive auxiliary measurement data associated with a measurement error model, and eliminate any candidate pose solution and CMAP inconsistent with the auxiliary measurement data. Auxiliary measurement data may include, but is not limited to, sensor data from a dissimilar sensor (236, FIG. 2) having a common time of validity to the captured image from which the image features were detected, or inertial navigation solutions and other auxiliary measurement data having a different time of validity and propagated by, e.g., an INS (238, FIG. 2), ILS, IMU, or other like auxiliary measurement unit toward the time of validity associated with the captured image.

Referring also to FIG. 9B, at a step 910 the vision-based navigation system determines an individual conditional error bound for each viable candidate pose solution, e.g., conditional on the associated candidate pose solution being correct.

At a step 912, the vision-based navigation system constructs, based on the set of individual conditional error bounds, a multiple-pose containment error bound corresponding to the set of viable candidate pose solutions (e.g., on the basis that at least one candidate pose solution of the set is the correct solution).

The method 900 may include additional steps 914 and 916. At the step 914, the vision-based navigation system evaluates the adequacy of the multiple-pose containment error bound based on an accuracy level of the navigation solution based on the set of viable candidate pose solutions as required for use of the navigation solution by flight operations executed by aircraft-based instruments and systems (e.g., navigation, guidance, flight control).

At the step 916, where the multiple-pose containment error bound meets or exceeds the accuracy level required by a particular flight operation, the vision-based navigation system forwards the multiple-pose containment error bound (with corresponding error model) and the navigation solution based on the set of viable candidate pose solutions) to the associated instruments and systems.

Conclusion

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A vision-based navigation system, comprising:
    at least one data storage element configured for storage of:
        constellation data corresponding to a set of constellation features, each constellation feature associated with nominal three-dimensional (3D) position data relative to a constellation reference frame, wherein the constellation features comprise runway features including at least one of approach lighting and runway edge markings;
        and
        processor-executable encoded instructions;
    at least one camera associated with a camera pose relative to the constellation reference frame;
    and
    at least one processor in communication with the camera and the data storage element, the at least one processor configurable by the processor-executable encoded instructions to:
        receive at least one plurality of candidate correspondences, each candidate correspondence associated with 1) at least one image feature detected in an image captured by the camera and 2) at least one constellation feature of the set of constellation features, the plurality of candidate correspondences including at least one ambiguous correspondence between the at least one image feature and the at least one constellation feature;
        determine two or more candidate pose solutions corresponding to the plurality of ambiguous correspondences based on the constellation data associated with the at least one constellation feature, each candidate pose solution corresponding to an estimate of the camera pose relative to the constellation reference frame;
        determine a viability level corresponding to each candidate pose solution;
        eliminate each non-viable candidate pose solution, wherein the viability level of the non-viable candidate pose solution fails to meet a predetermined viability threshold;
        determine a conditional pose error bound corresponding to each viable candidate pose solution;
        and
        determine, based on the one or more conditional pose error bounds, at least one containment pose error bound for a navigation solution associated with the set of viable candidate pose solutions.

2. The vision-based navigation system of claim 1, wherein the at least one processor is configured to:
    determine one or more candidate pose solutions corresponding to the plurality of ambiguous correspondences by generating one or more correspondence maps (CMAP), each CMAP based on a validity of at least one ambiguous correspondence and corresponding to a candidate pose solution;
    and
    wherein the conditional pose error bound corresponding to the candidate pose solution is conditioned on the validity of at least one ambiguous correspondence.

3. The vision-based navigation system of claim 1, wherein:
    the at least one candidate pose solution is associated with a time of validity;
    wherein the at least one processor is in communication with at least one auxiliary measurement source configured to generate auxiliary measurement data associated with a measurement error model;
    and
    wherein the at least one processor is configured to eliminate the at least one non-viable candidate pose solution based on the auxiliary measurement data.

4. The vision-based navigation system of claim 3, wherein:
    the at least one auxiliary measurement source includes at least one dissimilar sensor configured to generate dissimilar sensor data;
    and wherein the at least one processor is configured to eliminate the at least one non-viable candidate pose solution based on dissimilar sensor data corresponding to the time of validity.

5. The vision-based navigation system of claim 3, wherein the time of validity is a first time of validity, and:

wherein the auxiliary measurement data is associated with a second time of validity and propagated toward the first time of validity.

6. The vision-based navigation system of claim 1, wherein the at least one processor is configured to:

evaluate an adequacy of the at least one containment pose error bound relative to at least one accuracy level of the navigation solution, the accuracy level associated with at least one flight operation performed by an aircraft-based system;

and where the at least one containment pose error bound meets or exceeds the at least one accuracy level, forward one or more of the navigation solution and the at least one containment pose error bound to the associated aircraft-based system.

7. A method for high-confidence error overbounding of multiple candidate optical poses via a vision-based navigation system, the method comprising:

receiving at least one plurality of candidate correspondences, each candidate correspondence associated with 1) at least one image feature detected in an image captured by a camera and 2) at least one constellation feature associated with nominal three-dimensional (3D) position data relative to a constellation reference frame, the plurality of candidate correspondences including at least one ambiguous correspondence between the at least one image feature and the at least one constellation feature;

determining two or more candidate pose solutions associated with the at least one ambiguous correspondence based on the constellation data associated with the at least one constellation feature, each candidate pose solution corresponding to an estimate of an optical pose of the camera relative to the constellation reference frame;

determining a viability level corresponding to each candidate pose solution;

eliminating each non-viable candidate pose solution wherein the viability level corresponding to the non-viable candidate pose solution fails to meet a predetermined viability threshold;

determining a conditional pose error bound corresponding to each viable candidate pose solution;

and determining, based on the set of conditional pose error bounds, at least one containment pose error bound for a navigation solution associated with the set of viable candidate pose solutions.

8. The method of claim 7, wherein determining at least one candidate pose solution associated with the at least one ambiguous correspondence based on the constellation data associated with the at least one constellation feature includes:

generating one or more candidate correspondence maps (CMAP), each candidate CMAP based on an assumed validity of at least one ambiguous correspondence and corresponding to a candidate pose solution.

9. The method of claim 7, wherein the at least one candidate pose solution is associated with a time of validity, and:

wherein eliminating each non-viable candidate pose solution wherein the viability level corresponding to the non-viable candidate pose solution fails to meet a predetermined viability threshold, includes:

receiving from at least one auxiliary measurement source auxiliary measurement data associated with a measurement error model;

and eliminating at least one non-viable candidate pose solution based on the auxiliary measurement data.

10. The method of claim 9, wherein receiving from at least one auxiliary measurement source auxiliary measurement data associated with a measurement error model includes:

receiving, from at least one dissimilar sensor, dissimilar sensor data corresponding to the time of validity.

11. The method of claim 9, wherein the time of validity is a first time of validity, and receiving from at least one auxiliary measurement source auxiliary measurement data associated with a measurement error model includes:

receiving auxiliary measurement data associated with a second time of validity and propagated toward the first time of validity.

12. The method of claim 7, further comprising:

evaluating an adequacy of the at least one containment pose error bound relative to at least one accuracy level of the navigation solution, the accuracy level associated with at least one flight operation performed by an aircraft-based system;

and where the at least one containment pose error bound meets or exceeds the at least one accuracy level, forwarding one or more of the navigation solution and the at least one containment pose error bound to the associated aircraft-based system.

* * * * *